(12) United States Patent
Honan et al.

(10) Patent No.: US 11,226,751 B2
(45) Date of Patent: Jan. 18, 2022

(54) STORAGE ENCLOSURE RECONFIGURATION

(71) Applicant: HEWLETT PACKARD ENTERPRISE DEVELOPMENT LP, Houston, TX (US)

(72) Inventors: Brian G. Honan, Boise, ID (US); David Alan Daigle, Colorado Springs, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 81 days.

(21) Appl. No.: 16/443,542

(22) Filed: Jun. 17, 2019

(65) Prior Publication Data
US 2020/0393979 A1 Dec. 17, 2020

(51) Int. Cl.
G06F 3/06 (2006.01)

(52) U.S. Cl.
CPC .......... *G06F 3/0629* (2013.01); *G06F 3/0604* (2013.01); *G06F 3/0653* (2013.01); *G06F 3/0689* (2013.01); *G06F 3/0682* (2013.01)

(58) Field of Classification Search
CPC ................................ G06F 3/00; G06F 15/173
See application file for complete search history.

(56) References Cited

U.S. PATENT DOCUMENTS

| | | | |
|---|---|---|---|
| 7,552,291 B2 | 6/2009 | Marks et al. | |
| 7,584,325 B2 | 9/2009 | Holland et al. | |
| 8,074,105 B2 | 12/2011 | Kawitz et al. | |
| 8,260,974 B1* | 9/2012 | Fredette | G06F 3/0607 710/8 |
| 8,504,857 B1* | 8/2013 | Robillard | G06F 1/3206 713/324 |
| 9,411,764 B2 | 8/2016 | Andrews et al. | |
| 2006/0174085 A1* | 8/2006 | Wu | G11B 33/12 711/170 |
| 2008/0120687 A1 | 5/2008 | Johnson | |
| 2009/0267743 A1* | 10/2009 | Faroe | H04Q 9/00 340/10.1 |
| 2011/0191637 A1* | 8/2011 | Wight | G06F 11/00 714/43 |

(Continued)

OTHER PUBLICATIONS

Hewlett-Packard Development Company, L.P., "QuickSpecs: HP CloudSystem Matrix," Aug. 17, 2012, Version 26.

(Continued)

*Primary Examiner* — Getente A Yimer
(74) *Attorney, Agent, or Firm* — Trop, Pruner & Hu, P.C.

(57) ABSTRACT

Example implementations relate to reconfiguring storage devices of a storage enclosure. An indication of a cable connection may be received at a first port of the storage enclosure. Storage devices of the storage enclosure may be in communication with a controller via a second port of the storage enclosure. Responsive to receiving the connection indication, the set of storage devices may be reconfigured and/or zoned such that each of a first subset of the set of storage devices is enabled to communicate to a controller via the first port. Similarly, the set of storage devices may be further reconfigured and/or zoned such that each of a second subset of the set of storage devices is enabled to communicate to the controller via the second port.

20 Claims, 9 Drawing Sheets

(56) References Cited

U.S. PATENT DOCUMENTS

2012/0311224 A1* 12/2012 Myrah ................. H04L 49/455
          710/316
2014/0156878 A1* 6/2014 Hameed ................... G06F 3/00
          710/19

OTHER PUBLICATIONS

Huawei, "Capacity Expansion Guide 14," retrieved online May 16, 2019, https://support.huawei.com/enterprise/en/doc/EDOC1000092243/bd1530bd/planning-capacity-expansion-by-adding-disk-enclosures.
IBM, "Planning for Serial-attached SCSI Cables," retrieved online May 16, 2019, https://www.ibm.com/support/knowledgecenter/8247-22L/p8had/p8had__sascabling.htm.
Hewlett-Packard Development Company, L.P., "HP 6G Virtual SAS Manager User Guide," HP Part No. 634040-002, Edition: 2, Sep. 2011, 85 pages.
Hewlett-Packard Development Company, L.P., HP BladeSystem Deployment Guide for Solutions with 6Gb SAS BL Switches and External SAS Storage Enclosures, HP Part No. 634041-006, Edition: 6, Oct. 2013, 111 pages.
Dell, "Deploying Templates", Dell EMC OpenManage Enterprise-Modular Edition Version 1.20.00 for PowerEdge MX7000 Chassis User's Guide, Rev. A02, Jun. 2020, 2 pages.
Oracle, "SAS Domain Access Configuration", Sun Storage Common Array Manager Installation and Setup Guide, Chapter 8, available online at <https://web.archive.org/web/20131104234303/https://docs.oracle.com/cd/E20720_01/html/E20725-01/saszoning.html>. Nov. 4, 2013, 17 pages.

* cited by examiner

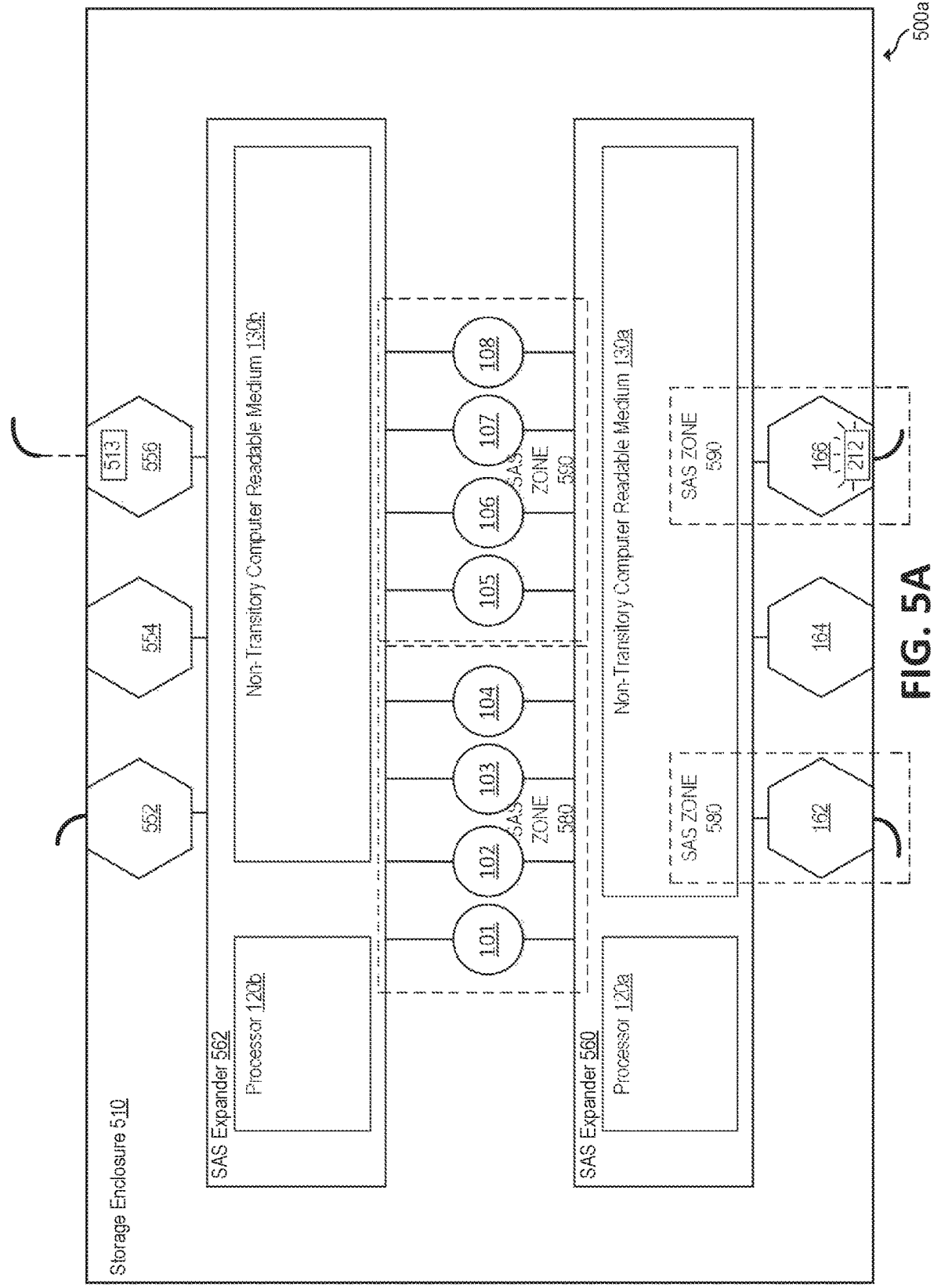

STORAGE ENCLOSURE RECONFIGURATION

BACKGROUND

A storage enclosure may include a physical casing housing storage devices for data storage. The storage enclosure may be directly or indirectly in communication with a node having storage controller(s). A storage controller may include a board, software and/or firmware. The storage controller may be in communication with the storage devices, and may otherwise handle the movement of data as well as any other system management functions of the storage devices via an I/O path. The storage enclosure may include ports to facilitate a connection between the storage devices and the node.

BRIEF DESCRIPTION OF THE DRAWINGS

Certain examples are described in the following detailed description and in reference to the drawings, in which:

FIGS. 5A and 5B are block diagrams illustrating another example storage enclosure having configured storage devices.

DETAILED DESCRIPTION OF SPECIFIC EXAMPLES

As noted above, a storage enclosure may include storage devices, and may further include ports to enable communication between any of the storage devices, and a controller for managing the storage devices. In an example, the storage devices may be in communication with a node housing storage controllers for managing the storage devices via an I/O path, including for example, an external bus.

With advancement in data communications and computing technologies, storage devices may include increased capacity, and storage enclosures may include an increasing number of ports. In examples described herein, storage devices may include, for example, hard disk drives (HDDs), solid state drives (SSDs), or the like, or any other physical device for data storage, or a combination thereof. The storage enclosure may be a physical casing designed to house storage devices, including components to power the storage devices and ports to enable communication between a housed storage device and an internal or external controller. In some example implementations, a physical cable may connect the port of the storage enclosure to the controller.

Examples presented herein relate to receiving an indication of a cable connection at a first port of a storage enclosure including at least a first and second port. The storage enclosure may include a set of storage devices in a first configuration to enable each of the set of storage devices to communicate to a controller node via a second port of the storage enclosure. Upon receiving the connection indication, the set of storage devices may be reconfigured from the first configuration to a second configuration to enable each of a first subset of the set of storage devices to communicate to the controller node via the first port and each of a second subset of the set of storage devices to communicate to the controller node via the second port. The second port in the second configuration may handle less traffic than in the first configuration, where the second port was available to the set of storage devices of the storage enclosure.

Figure 1A:
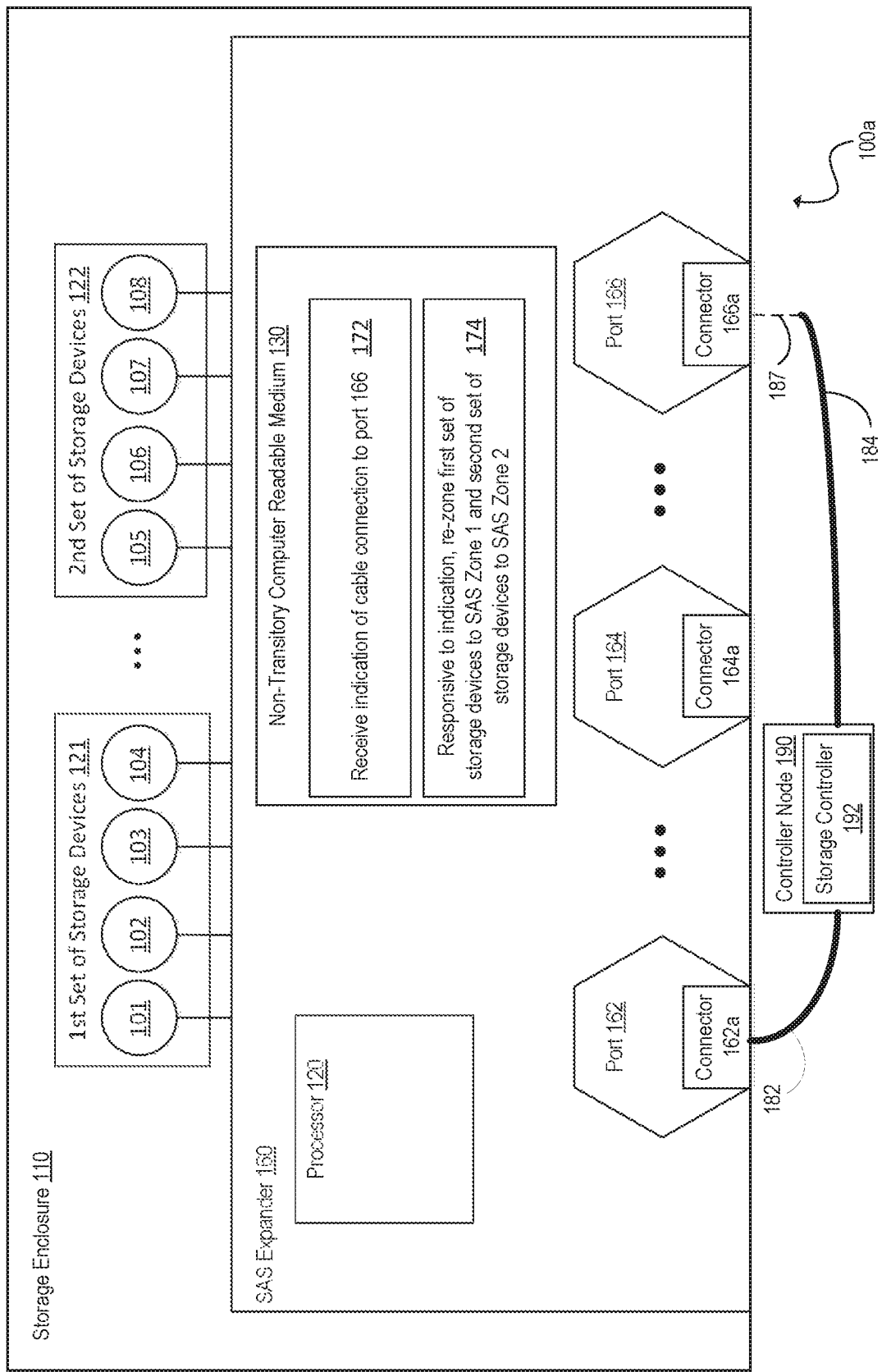
FIGS. 1A and 1B are block diagrams of an example storage enclosure having configured storage devices.
Figure 1B:
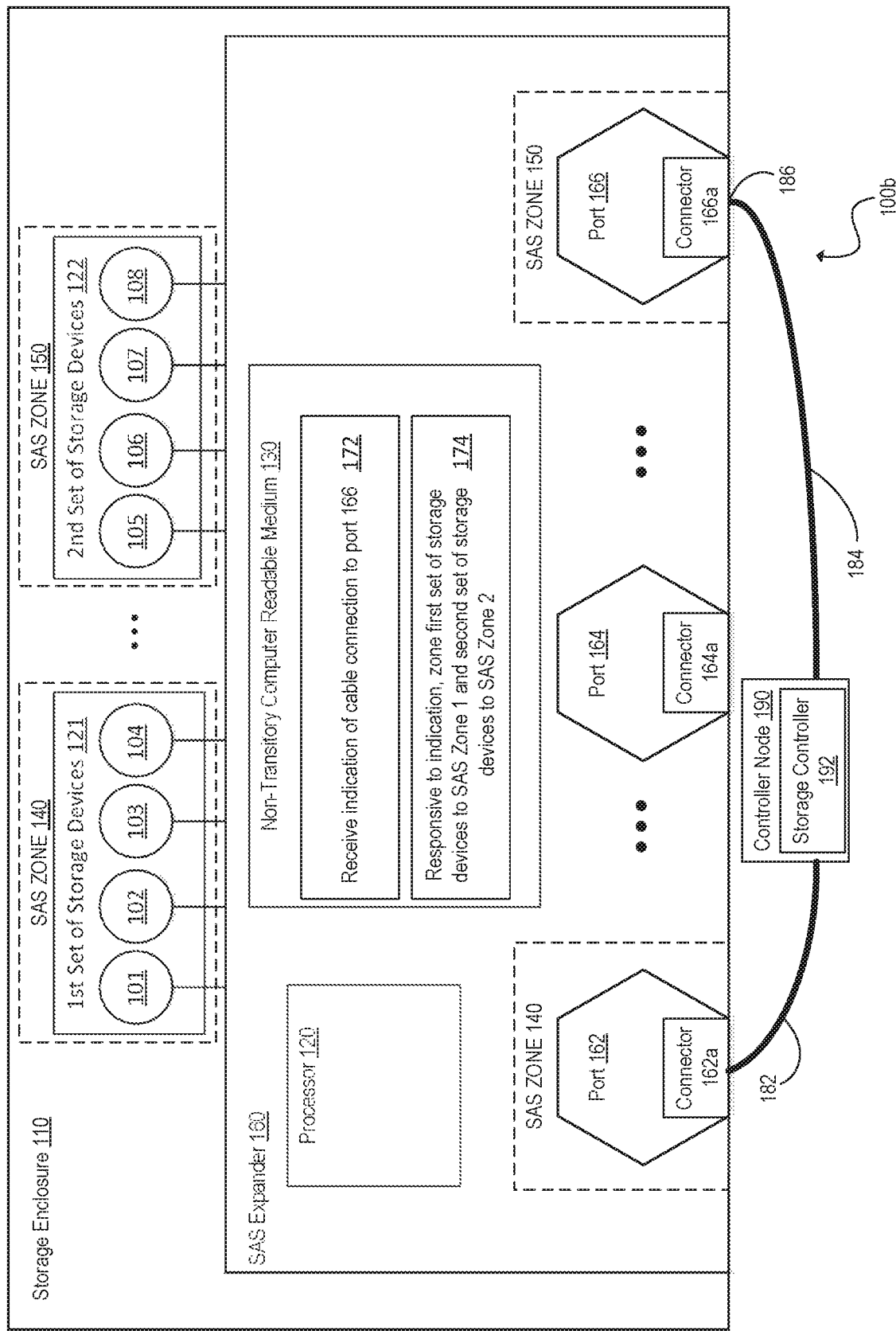

FIGS. 1A and 1B are block diagrams, 100a and 100b respectively, of an example storage enclosure having configured storage devices. Example storage enclosure 110 may include an example first set of storage devices 121, storage devices 101-104 respectively, and an example second set of storage devices 122, 105-108 respectively. While two sets of four storage devices are illustrated by way of example, any number of sets of storage devices including any number of devices may be implemented. Furthermore, each set of storage devices may, in some example implementations, include a different number of storage devices, and each storage device of each set may be of a like or different storage device type.

Any number of storage devices 101-108 may be in communication with controller node 190. Controller node may include a storage controller 192 for performing input/output (IO) operations (e.g., read operations and write operations) on storage devices or otherwise managing the movement of data between, to, and/or from storage devices, as well as any other data and/or system management functions of the storage devices, e.g. RAID, volume management, etc. Storage devices 101-108 may be in communication with controller node 190 via a port, e.g. any of ports 162-166. In an example implementation, storage devices 101-108 may be in communication with controller node 190 via a Serial Attached Small Computer System interface (SCSI) protocol, commonly referred to as a SAS protocol. A SAS protocol is a standard storage network protocol for transferring data to/from a storage device.

Specifically, storage enclosure 110 may include a SAS expander 160, which may include example ports 162-166 for facilitating communication between SAS devices, in this case any of storage devices 101-108, and controller node 190. In a SAS domain, a storage device may be referred to as a SAS "target" and controller node 190 may be referred to as a SAS "initiator." A SAS expander may expand the number of ports of a SAS network domain to interconnect SAS initiators and SAS targets.

A port is a logical concept that may include and/or otherwise facilitate one or more physical links in a SAS network domain. In a SAS domain, these physical links may be commonly referred to as PHYs. Ports may include any number of PHYs, and PHYs may be logically grouped for increased bandwidth. Each of ports 162-166 may be a SAS port and may include a SAS connector (e.g., 162a-166a respectively) for receiving a physical SAS cable, e.g. cable 182, to facilitate at least part of the I/O path between any of storage devices 101-108 and controller node 190. In an example, cable 182 may be connected to the connector 162a of port 162 at a first end and connected to a connector of controller node 190, a host bus adapter (not shown), or any other storage enclosure (not shown) at a second end.

SAS expander 160 may enable any of storage devices 101-108 to communicate with any number of ports 162-166. SAS expander may function as a switch and may comprise hardware or a combination of hardware and software to implement functionalities for zoning and/or otherwise configuring a storage device to communicate with controller node 190 via any one or more of ports 162-166. Although three example ports are shown, any number of ports may be included in storage enclosure 110. Furthermore, each of ports 162-166 may be, for purposes of clarity and conciseness, may be referenced below as a single port. However, it may be understood that any of ports 162, 164, and/or 166 may represent a set of ports, each port of the set including a respective connector for receiving a SAS cable. In an example implementation, any of ports 162-166 may be a wide SAS port containing more than one PHY. In some examples any of ports 162-166 may include 2, 4, or 8 PHYs.

In this example, SAS expander 160 may include a processor 120, and a non-transitory computer readable medium 130 including instructions for configuring communication of storage devices 101-108 via ports 162-166. Non-transitory machine-readable storage medium 130 may be implemented fully or partially within storage enclosure 110 or non-transitory machine-readable storage medium 130 may be remote to, and otherwise in communication with, storage enclosure 110. Likewise, processor 120 may represent any number of physical processors capable of executing instructions stored by non-transitory machine-readable storage medium 130. Further, non-transitory machine-readable storage medium 130 may be fully or partially integrated in SAS expander 160, or it may be separate but accessible to SAS expander 160.

In one example, the instructions may be part of an installation package that when installed can be executed by processor 120 to configure communication of storage devices 101-108 via ports 162-166. In this case, non-transitory computer readable storage medium 130 may be a portable medium such as a CD, DVD, or flash drive or a memory maintained by a server from which the installation package can be downloaded and installed. In another example, the program instructions may be part of an application or applications already installed.

Processor 120 may be a central processing unit (CPU), graphics processing unit (GPU), microprocessor (e.g. internal management microprocessor), and/or other hardware device suitable for retrieval and execution of instructions stored in non-transitory machine-readable storage medium 130. Processor 120 may fetch, decode, and execute program instructions 172-174, and/or other instructions. As an alternative or in addition to retrieving and executing instructions, processor 120 may include at least one electronic circuit comprising a number of electronic components for performing the functionality of instructions 172-174, and/or other instructions.

In an example implementation, storage devices 101-108 may be in a default configuration such that each of drives 101-108 are visible behind port 162. For example, each of first set of storage devices 121 and second set of storage devices 122 may be configured to be in communication with controller node 190 via port 162. For purposes of explanation, the configuration in which each storage device may communicate with controller node 190 via port 162 may be considered an "unzoned" configuration, a direct connection configuration, and/or a Daisy Chain configuration. For purposes of explanation as further described herein, an unzoned configuration is one in which each Phy of each port is zoned to a common zone group which contains each storage device and port attached to, or otherwise including in, the SAS expander, e.g. SAS expander 160 and SAS expander 560 described below.

In an example implementation, storage devices 101-108 may be in a default configuration such that each of drives 101-108 are visible behind port 162. For example, each of first set of storage devices 121 and second set of storage devices 122 may be configured to be in communication with controller node 190 via port 162. For purposes of explanation, the configuration in which each storage device may communicate with controller node 190 via port 162 may be considered an "unzoned" configuration, a direct connection configuration, and/or a Daisy Chain configuration. For purposes of explanation as further described herein, an unzoned configuration is one in which each Phy of each port is zoned to a common zone group which contains each storage device and port attached to, or otherwise included in, the SAS expander, e.g. SAS expander 160 and SAS expander 560 described below.

SAS standards support the zoning of resources within a SAS domain. SAS expander 160 may control the zoning of resources within a storage enclosure 110. A particular zoning may dictate the communication, or conversely the isolation, of resources within a SAS domain. In this example implementation, storage devices assigned to SAS zone 140 may communicate with controller node 190 via port 162, and storage devices assigned to SAS zone 150 may communicate with controller node 190 via port 166. The zoning of a first set of storage devices to a first port and a second set of storage devices to a second port of a storage enclosure may be referred to as a "Split Cage Configuration." In this configuration, a drive cage may be logically partitioned, each partition with its own SAS port for communication to and from the controller node. In an example implementation, each port of the storage enclosure may be zoned to 0 or 1 zone groups. The Split Cage Configuration enables greater usage of the plurality of ports of storage enclosure 110, in which a greater number of PHYs are available to storage devices 101-108 of storage enclosure 110. For low latency storage devices, providing an increased amount of data bandwidth over the connection protocol enables a greater performance utilization by minimizing link contention.

In an example implementation, storage devices zoned to SAS zone 140 are isolated from port 166 because these storage devices are not zoned to zone 150. Similarly, storage devices zoned to SAS zone 150 are isolated from port 162 because these storage devices are not zoned to zone 140. In an example instance, SAS expander 160 may validate and otherwise deny any requested connection between a storage device of SAS zone 140 and port 166 as well as any requested connection between a storage device of SAS zone 150 and port 162.

Figure 2:
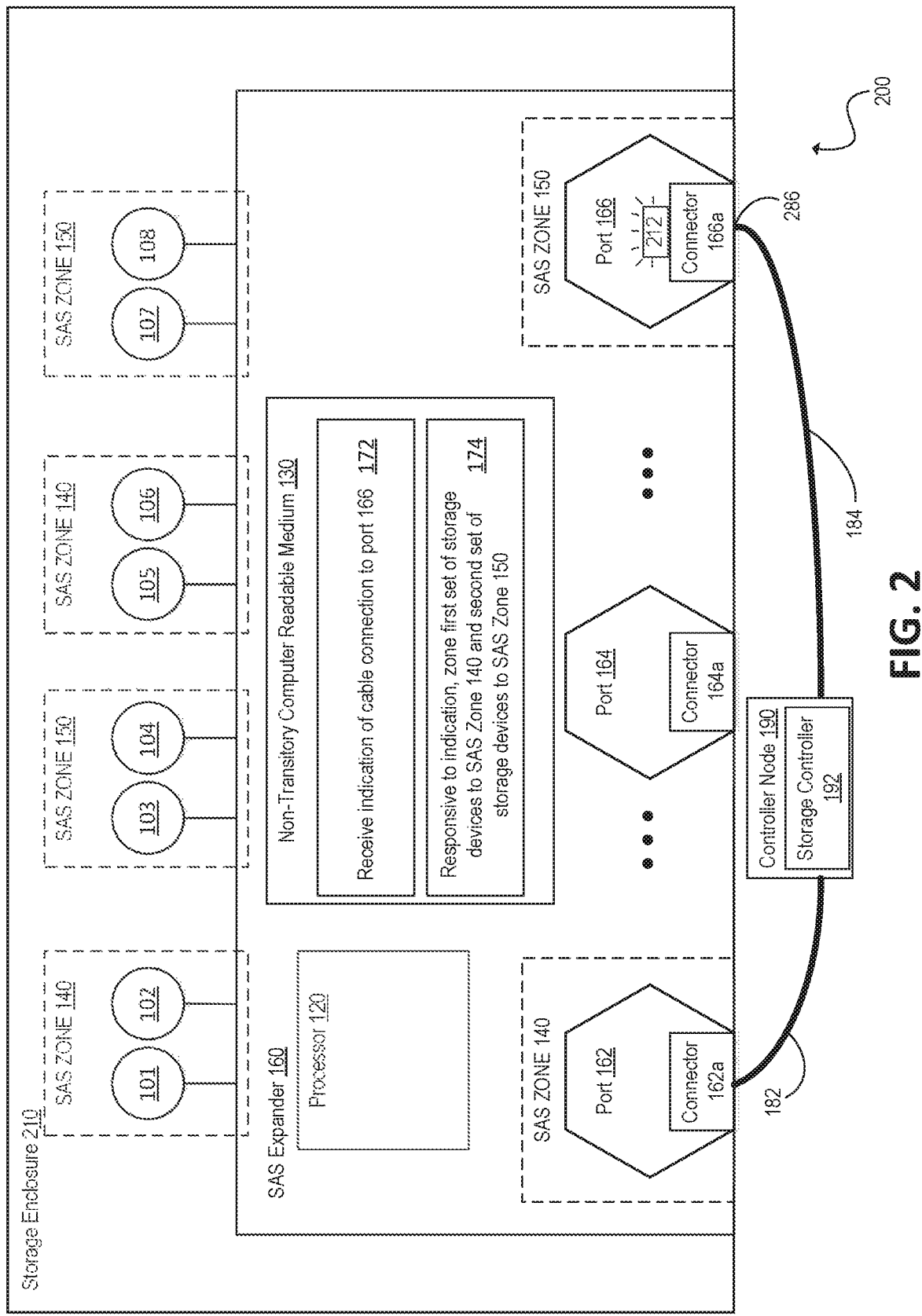
FIG. 2 is a block diagram illustrating an example storage enclosure having re-zoned storage devices.

FIG. 2 is a block diagram of another example storage enclosure 210 having configured storage devices. Storage enclosure 210 may include similar components to those described at FIGS. 1A and 1B, including storage devices 101-108 in communication with a storage controller 192 at a controller node 190 via ports 162-166; connectors 162a-166a of ports 162-166 configured to receive cables 182 and/or 184; and SAS expander 160, having processor 120 and non-transitory computer readable medium 130 having instructions 172 and 174.

Instructions 172, as described above with respect to FIGS. 1A and 1B, may receive an indication of a cable connection 286 at port 166. In an example implementation, a sensor 212 of port 166 may be disposed in communication with connector 166a. Sensor 212 may be an electronic sensor and may detect the presence of cable 184 when connected at connector 166a. The sensor 212 may transmit the indication of the connection to processor 120, which, responsive to receiving the indication, may execute instructions 174.

Instructions 174, as described above with respect to FIGS. 1A and 1B, may, responsive to receiving the indication, zone a first set of storage devices of storage enclosure 210 to a first SAS zone, e.g. zone 140, and zone a second set of storage devices of storage enclosure 210 to a second SAS zone. In this example, storage devices of the first set, i.e. storage devices zoned to SAS zone 140, and storage devices of the seconds set, i.e. storage devices zoned to SAS zone 150, are disposed within storage enclosure 210 in alternating pairs. For example, as illustrated, storage devices 101 and 102 are zoned to SAS zone 140, storage devices 103 and 104 are zoned to SAS zone 150, storage devices 105 and 106 are zoned to SAS zone 140, and storage devices 107 and 108 are zoned to SAS zone 150. Although storage devices 101-108 are zoned in alternating pairs in this example, any number of zoning configurations may be implemented. Furthermore, a different amount of storage devices of the first set may be disposed within storage enclosure 210 than storage devices of the second set such that more storage devices of storage enclosure 210 may be zoned to a first zone than a second zone.

As described above with reference to FIGS. 1A and 1B, storage devices assigned to SAS zone 140 may communicate with controller node 190 via port 162, and storage devices assigned to SAS zone 150 may communicate with controller node 190 via port 166. In an example implementation, storage devices zoned to SAS zone 140 are isolated from port 166, and storage devices zoned to SAS zone 150 are isolated from port 162.

Figure 3:
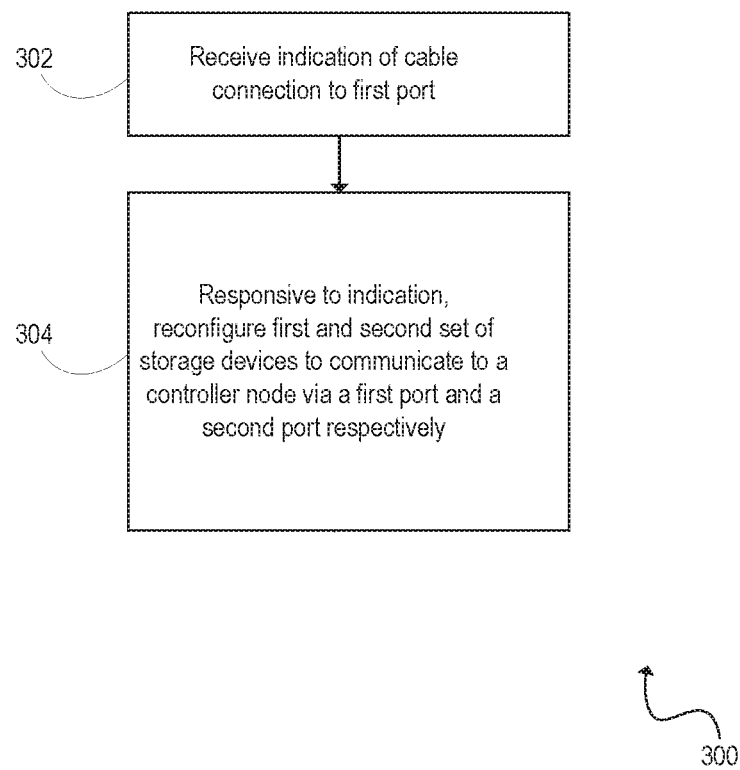
FIG. 3 is a flowchart illustrating an example method for reconfiguring storage devices of a storage enclosure.
Figure 4:
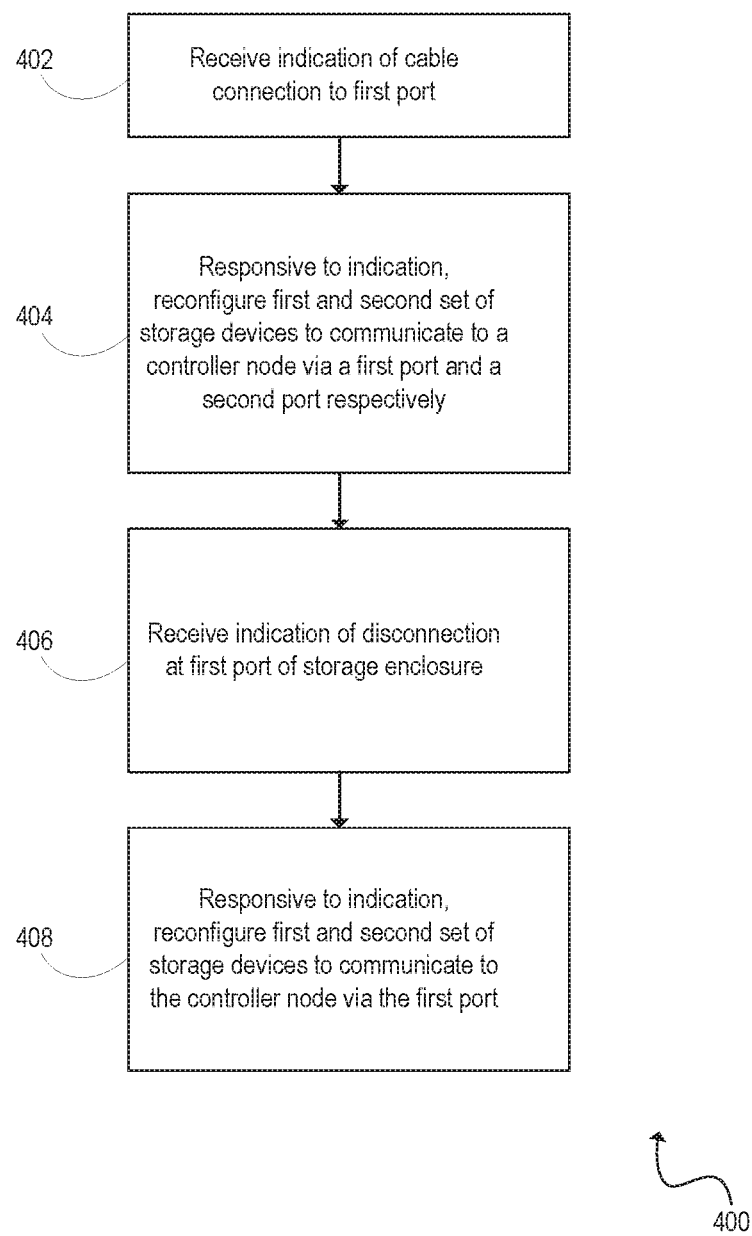
FIG. 4 is a flowchart illustrating another example method for reconfiguring storage devices of a storage enclosure.

FIG. 3 and FIG. 4 are flowcharts, 300 and 400 respectively, illustrating a method for reconfiguring storage devices of a storage enclosure. Although execution of method 300 and 400 are described below with reference to storage enclosure 110 of FIGS. 1A and 1B, this is for explanatory purposes and other suitable components for execution of method 300 and method 400 may be utilized. Additionally, the components for executing method 300 and 400 may spread among multiple devices. Method 300 and method 400 may be implemented in the form of executable instructions stored on a machine-readable storage medium and/or in the form of electronic circuitry, e.g. hardware. In some examples, steps of method 300 and method 400 may be executed substantially concurrently or in a different order than shown in FIG. 3 and FIG. 4. In some examples, method 300 and 400 may include more or less steps than are shown in FIG. 3 and FIG. 4. In some examples, some of the steps of method 300 and 400 may, at certain times, be ongoing and/or may repeat.

At block 302, an indication of a cable connection at a first port may be received. For example, with reference to block diagram 200 of FIG. 2, cable 184 may be connected 286 to connector 166*a* of port 166. Port 166, responsive to connection 286, may transmit a connection indication to processor 120. In an example implementation, connection 286 may be detected by a sensor 212 of port 166.

At block 304, a set of storage devices may be reconfigured from a first configuration to a second configuration responsive to receiving the connection indication. The set of storage devices, in an example implementation, may be reconfigured such that a first subset of the set of storage devices may communicate with a controller node via a first port and a second subset of the set of storage devices may communicate with the controller node via a second port. Referring to storage enclosure 110 as illustrated at FIG. 1B, storage devices 101-104 may be reconfigured such that each of storage devices 101-104 are in communication with controller node 190 via port 162. Similarly, storage devices 105-108 may be reconfigured such that each of storage devices 105-108 are in communication with controller node 190 via port 166.

Method 400 of FIG. 4 may include similar blocks to those described at FIG. 3. For example, an indication of a cable connection at a first port may be received at block 402, like at block 302 as described above. Additionally, a set of storage devices may be reconfigured from a first configuration to a second configuration responsive to receiving the connection indication at block 404, like at block 304 described above.

At block 406, an indication of a disconnection at the first port of the storage enclosure may be received. For example, with reference to block diagram 100*a* of FIG. 1A, cable 184 may be disconnected 187 from connector 166*a* of port 166. Port 166 may detect the absence of cable 184. Port 166, responsive to the disconnection 187, may transmit a disconnection indication to processor 120. In an example implementation, the disconnection may be detected by a sensor (not shown) of port 166, similar to sensor 212 described above with reference to FIG. 2.

At block 408, the set of storage devices may be reconfigured from the second configuration to the first configuration responsive to receiving the disconnection indication. The set of storage devices, in an example implementation, may be reconfigured such that a first subset of the set of storage devices and the second subset of the set of storage devices are in communication with the controller node via the first port. Put another way, at block 408 the first subset of the set of storage devices and the second subset of the set of storage devices can be said to be "unzoned." Referring to storage enclosure 110 as illustrated at FIG. 1A, storage devices 101-108 may be reconfigured such that each of storage devices 101-108 are in communication with controller node 190 via port 162 of storage enclosure 110.

Figure 5B:
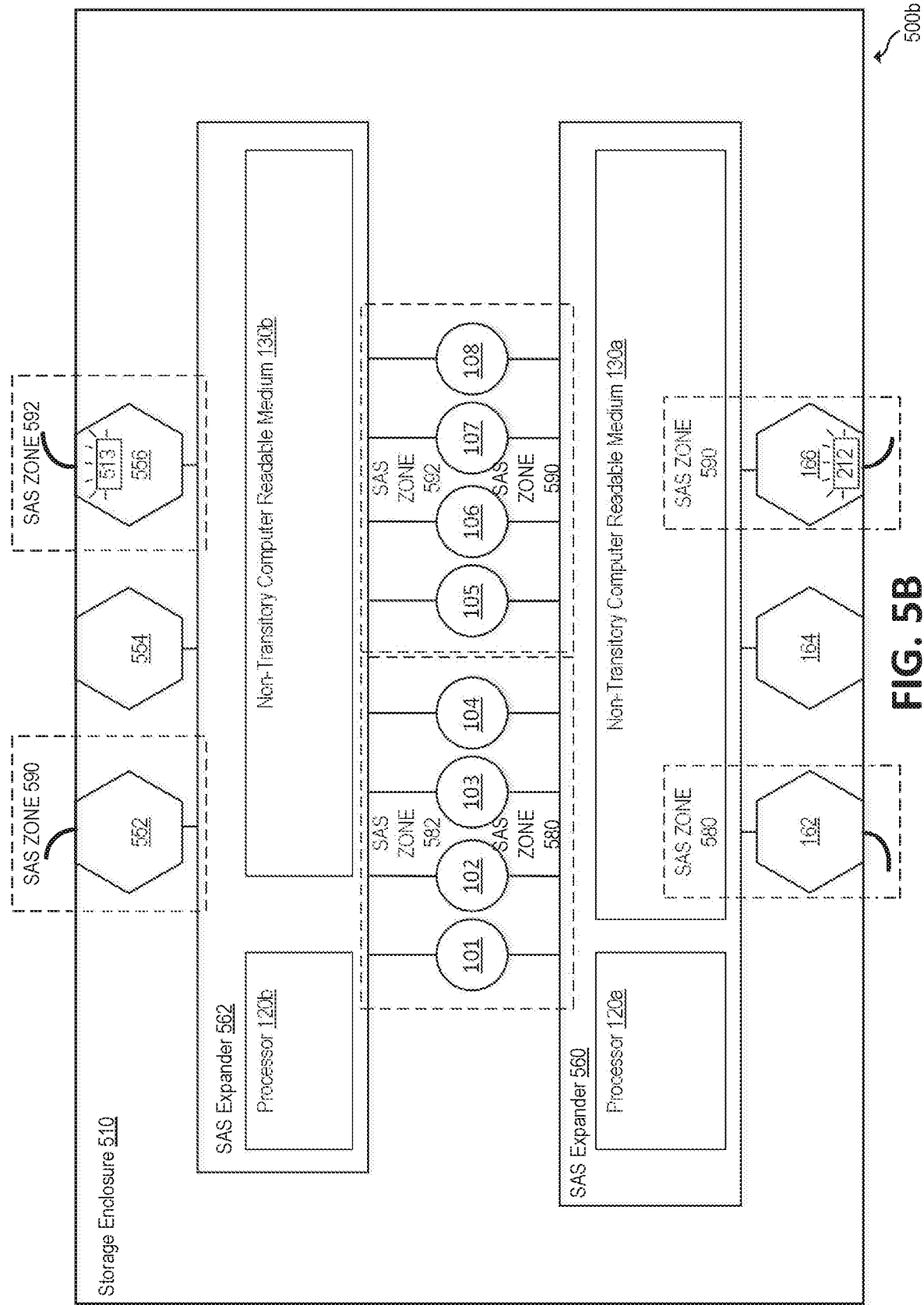

FIGS. 5*a* and 5*b* are block diagrams of another example storage enclosure 510 having configured storage devices. Storage enclosure 510 may include similar components to those described at FIGS. 1A and 1B, including storage devices 101-108 in communication with a storage controller at a controller node (not shown) via ports 162-166, and connectors 162*a*-166*a* of ports 162-166 configured to receive cables 182 and/or 184.

Storage enclosure 510 may include any number of SAS expanders and may include a plurality of SAS expanders for purposes of redundancy. Thus, if an I/O path from a storage device to a controller node fails, an additional I/O path remains available. In this illustrated example, storage enclosure 510 includes SAS expander 560 and 562 respectively. SAS expander 560 and/or SAS expander 562 may include similar components to that of SAS expander 160 of FIGS. 1A, 1B, and FIG. 2. For example, SAS expander 560 and/or SAS expander 562 may include a processor, 120*a* and 120*b* respectively, and a non-transitory computer readable medium, 130*a* and 130*b* respectively, including instructions executable by the respective processor local to its respective storage expander.

For purposes of conciseness, instructions of non-transitory computer readable medium 130*a* and non-transitory computer readable medium 130*b* are not illustrated. However, non-transitory computer readable medium 130*a* and non-transitory computer readable medium 130*b* may, by way of example, include similar instructions to non-transitory computer readable medium 130 of FIGS. 1A and 1B and FIG. 2, including instructions 172 for receiving an indication of a cable connection at port 166 (or 556 respectively), and instructions 174 for zoning a first set of storage devices of storage enclosure 510 to a first SAS zone, as well as a second set of storage devices of storage enclosure 510 to a second SAS zone.

In this example, port 166 may detect a cable connection (e.g. via sensor 212), and may thereby zone storage devices 101-104 at SAS zone 580 such that storage devices 101-104 are in communication with a controller node (not shown) via port 162, and zone storage devices 105-108 at SAS zone 590 such that storage devices 105-108 are in communication with a controller node (not shown) via port 166. Conversely, port 556 may detect no cable connection, or in some examples may detect a cable disconnect at port 556 (e.g. via sensor 513).

Because of this cable disconnect, storage devices 101-108 may not be zoned at SAS expander 562 or may otherwise be configured differently than at SAS expander 560. At SAS expander 562 for example, storage devices 101-108 may be unzoned and may otherwise be configured such that storage devices 101-108 are in communication with a controller node (not shown) via port 556. Accordingly, each SAS expander may be configured differently despite storage enclosure 510 including multiple SAS expanders for purposes of redundancy.

FIG. 5B includes the storage enclosure of FIG. 5a having a cable connected at port 556. In an example implementation, sensor 513 may detect the connection at port 556 and may transmit an indication of the connection, e.g. to processor 120b. Responsive to receiving the connection indication, storage devices 101-108 may be zoned. Specifically, storage devices 101-104 may be zoned to SAS zone 582 such that storage devices 101-104 are in communication with a controller node (not shown) via port 552, and storage devices 105-108 may be zoned to SAS zone 592 such that storage devices 105-108 are in communication with a controller node (not shown) via port 556. Accordingly, storage devices 101-108 may be zoned at SAS expander 560 and at SAS expander 562 and storage devices 105-108 may be zoned to SAS zone 590 and 592 simultaneously.

Figure 6:
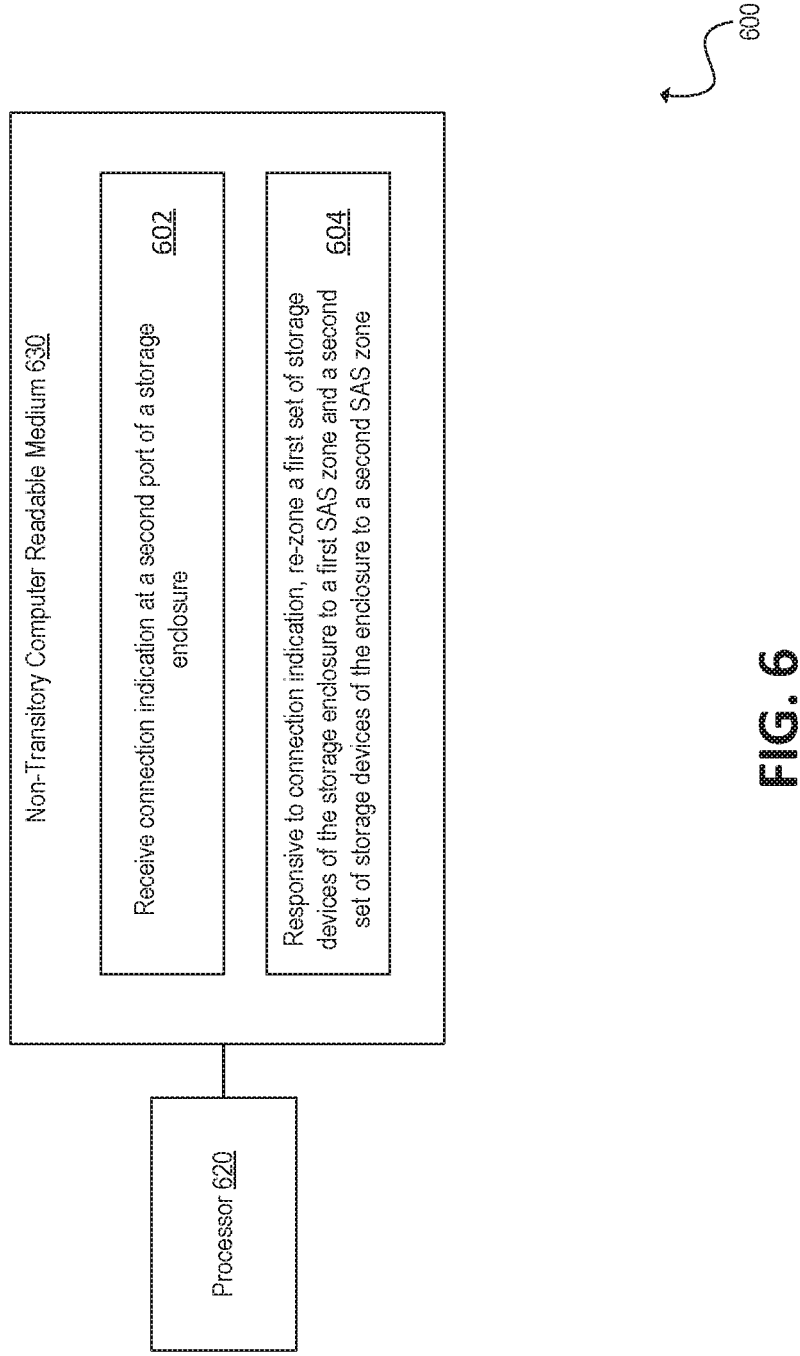
FIG. 6 is an example non-transitory computer readable medium for reconfiguring storage devices of a storage enclosure.

FIG. 6 is a block diagram 600 of an example non-transitory computer readable medium 630 for reconfiguring storage devices of a storage enclosure. Non-transitory computer readable medium 630 may include instructions 602-604 to be executed by processor 620. Instructions 602 may be similar to instructions 172 as described above with reference to FIGS. 1A and 1B and FIG. 2. Specifically, instructions 602 may include receiving a connection indication at a second port of a storage enclosure. The storage enclosure, for example, may include an unzoned first and second set of storage devices such that the storage devices of the first and second sets are to communicate with a controller node via a first port.

Non-transitory computer readable medium 630 may further include instructions 604, which may be similar to instructions 174 as described above with reference to FIGS. 1A and 1B and FIG. 2. Responsive to receiving the connection indication, the aforementioned storage devices may be zoned such that the first set of storage devices is zoned to the first SAS zone and the second set of storage devices is zoned to the second SAS zone. At the first zone, storage devices may communicate with a storage controller via the first SAS port and at the second zone, storage devices may communicate with the storage controller via the second SAS port.

Figure 7:
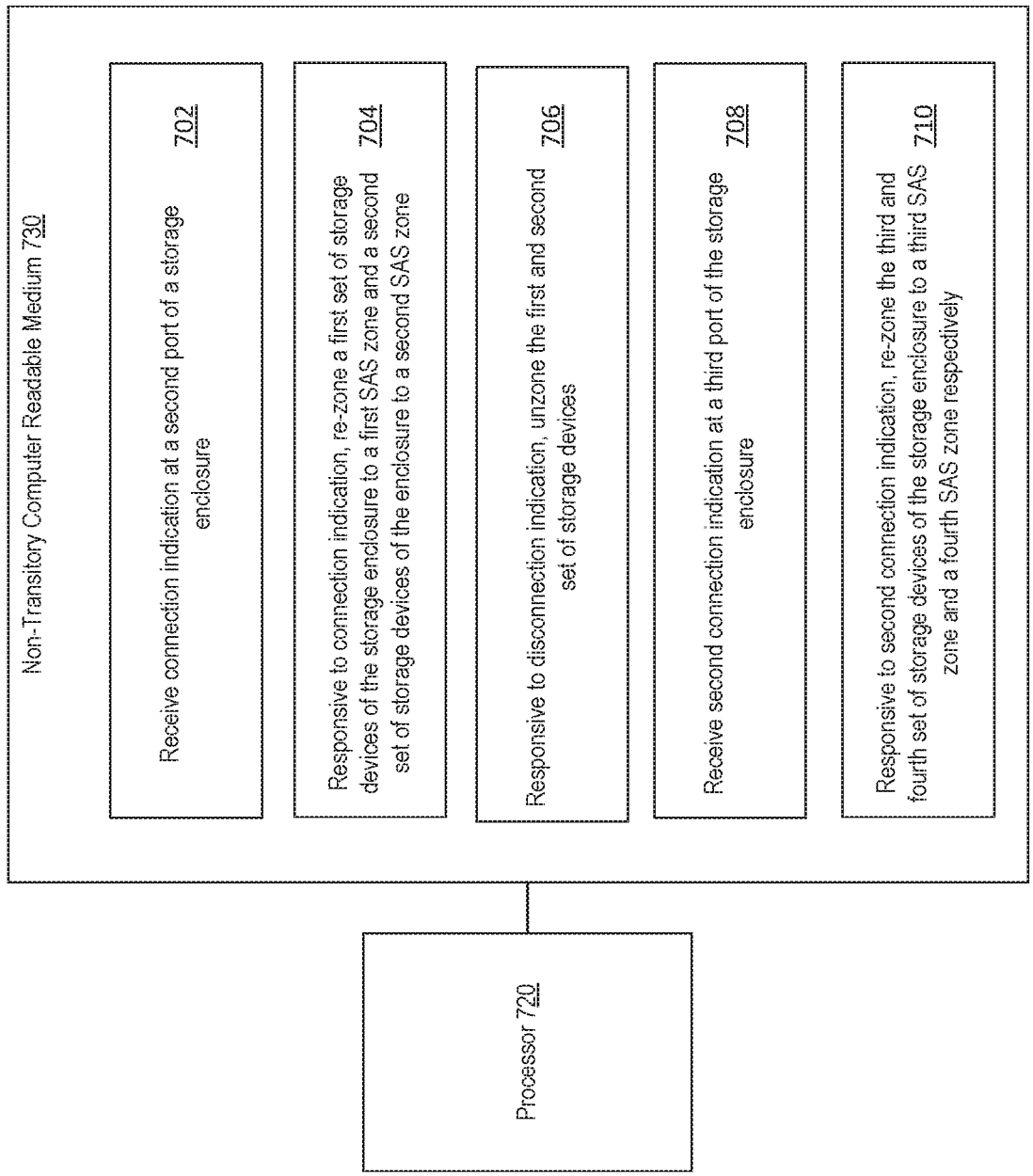
FIG. 7 is another example non-transitory computer readable medium for reconfiguring storage devices of a storage enclosure.

FIG. 7 is a block diagram 700 an of example non-transitory computer readable medium 730 for reconfiguring storage devices of a storage enclosure. Non-transitory computer readable medium 730 may include instructions 702-710 to be executed by processor 720. Instructions 702-704 may be similar to instructions 602-604 described above with reference to FIG. 6. Furthermore, processor 720 and non-transitory computer readable medium 730 may be similar to processor 120 and non-transitory computer readable medium 130 described above with reference to FIGS. 1A and 1B.

Instructions 706 may include receiving an indication of a disconnection at a first port of the storage enclosure. For example, with reference to block diagram 100a of FIG. 1A, cable 184 may be disconnected 186 from connector 166a of port 166. Port 166, responsive to disconnection 186, may transmit a disconnection indication to processor 120, and the storage devices, e.g. storage devices 101-108 of storage enclosure 110, may be unzoned as described above with reference to FIG. 4.

Instructions 706 may include receiving an indication of a connection at a third port of the storage enclosure. For example, with reference to block diagram 500b of FIG. 5B, an indication of a connection may be detected at port 556, e.g. via sensor 513. Port 556, responsive to detecting a cable connection, may transmit a connection indication to processor 120b, and storage devices 101-104 may be zoned to SAS zone 582 such that storage devices 101-104 are in communication a storage controller via port 552. Similarly, storage devices 105-108 may be zoned to SAS zone 592 such that storage devices 105-108 are in communication a storage controller via port 556.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method executed by a processor for reconfiguration of a storage enclosure, the method comprising:
   receiving an indication of a cable connection at a first port of the storage enclosure, the storage enclosure having a set of storage devices in a first configuration to enable each storage device of the set of storage devices to communicate to a controller node via a second port of the storage enclosure; and
   responsive to receiving the indication, reconfiguring the set of storage devices from the first configuration to a second configuration, the reconfiguring comprising assigning a first subset of the set of storage devices to a first zone, and assigning a second subset of the set of storage devices to a second zone different from the first zone, the reconfiguring enabling each storage device of the first subset of the set of storage devices to communicate to the controller node via the first port and each storage device of the second subset of the set of storage devices to communicate to the controller node via the second port, wherein the first and second subsets are different.

2. The method of claim 1, wherein the first and second ports are Serial Attached SCSI (SAS) ports.

3. The method of claim 2, wherein, when the set of storage devices is in the second configuration, each storage device of the first subset of storage devices is isolated from the second port, and each storage device of the second subset of storage devices is isolated from the first port.

4. The method of claim 1, further comprising, responsive to receiving an indication of a cable disconnection at the first port of the storage enclosure, reconfiguring the set of storage devices from the second configuration to the first configuration.

5. The method of claim 1, wherein the processor is an internal management microprocessor within the storage enclosure.

6. A storage enclosure, the storage enclosure to house first and second sets of storage devices, the storage enclosure comprising:
   first and second SAS ports;
   wherein in a first configuration the first and second sets of storage devices are unzoned and in communication with a controller node via the first SAS port;
   a processor; and
   a non-transitory machine-readable storage medium comprising instructions executable by the processor to:
      receive an indication that a cable is connected at the second SAS port; and
      responsive to receiving the indication, zone the first and second sets of storage devices such that the first set of storage devices is zoned to a first SAS zone and the second set of storage devices is zoned to a second SAS zone, wherein storage devices zoned to the first SAS zone are configured to communicate with a storage controller via the first SAS port, and storage devices zoned to the second SAS zone are configured to communicate with a storage controller via the second SAS port.

7. The storage enclosure of claim 6, further comprising an expander, wherein the processor and the non-transitory machine-readable storage medium comprising the instructions are part of the expander.

8. The storage enclosure of claim 6, wherein the storage devices zoned to the first SAS zone are isolated from the second SAS port, and the storage devices zoned to the second SAS zone are isolated from the first SAS port.

9. The storage enclosure of claim 6, further comprising a sensor to detect a connection of the cable to the second SAS port, and to transmit the indication to the processor in response to the detection of the connection.

10. The storage enclosure of claim 6, further comprising a sensor to detect a disconnection of the cable from the second SAS port, and to transmit a disconnect indication to the processor in response to the detection of the disconnection.

11. The storage enclosure of claim 10, wherein the non-transitory machine-readable storage medium further comprise instructions to, responsive to receiving the disconnect indication, unzone the first and second sets of storage devices.

12. The storage enclosure of claim 6, wherein the first set of storage devices and the second set of storage devices are disposed within the storage enclosure in alternating pairs.

13. The storage enclosure of claim 6, wherein the first set of storage devices has a different quantity of storage devices than the second set of storage devices.

14. The storage enclosure of claim 6, wherein the first and second SAS ports are wide SAS ports.

15. The storage enclosure of claim 6, wherein the processor is an internal management microprocessor within the storage enclosure.

16. A non-transitory computer readable medium comprising instructions executable by a processor to:
   receive a connection indication at a second SAS port of a storage enclosure, the storage enclosure including an unzoned first and second set of storage devices such that the storage devices of the first and second sets are to communicate with a controller node via a first SAS port; and
   responsive to receiving the connection indication, zone the storage devices such that the first set of storage devices is zoned to a first SAS zone and the second set of storage devices is zoned to a second SAS zone, wherein storage devices zoned to the first SAS zone are configured to communicate with the storage controller via the first SAS port and storage devices zoned to the second SAS zone are configured to communicate with the storage controller via the second SAS port.

17. The non-transitory computer readable medium of claim 16, wherein the storage devices of the first SAS zone are isolated from the second port, and wherein the storage devices of the second SAS zone are isolated from the first port.

18. The non-transitory computer readable medium of claim 16, further comprising instructions to, responsive to receiving an indication of a disconnection of a cable at the first port, unzone the first set of storage devices and the second set of storage devices.

19. The non-transitory computer readable medium of claim 16, further comprising instructions to:
   receive a second connection indication at a third port of the storage enclosure, wherein the first set of storage devices and the second set of storage devices are in communication with a fourth port of the storage enclosure; and
   responsive to receiving the second connection indication, re-zone the first set of storage devices and the second set of storage devices such that the first set of storage devices is zoned to a third SAS zone and the second set of storage devices is zoned to a fourth SAS zone, wherein storage devices zoned to the third SAS zone are configured to communicate with the storage controller via the third port.

20. The non-transitory computer readable medium of claim 16, wherein the instructions are executable by the processor within the storage enclosure.

* * * * *